United States Patent
Fang et al.

(10) Patent No.: US 11,692,103 B1
(45) Date of Patent: Jul. 4, 2023

(54) METHOD FOR IMPROVING CORROSION RESISTANCE OF VINYL ESTER RESIN

(71) Applicants: Guangdong Meiheng New Material Technology Co., Ltd, Qingyuan (CN); South China University of Technology, Guangzhou (CN)

(72) Inventors: Heng Fang, Qingyuan (CN); Yanying Wei, Guangzhou (CN); Yurun Dai, Guangzhou (CN)

(73) Assignees: GUANGDONG MEIHENG NEW MATERIAL TECHNOLOGY CO., LTD, Qingyuan (CN); SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/078,715

(22) Filed: Dec. 9, 2022

Related U.S. Application Data

(63) Continuation of application No. PCT/CN2022/081092, filed on Mar. 16, 2022.

Foreign Application Priority Data

Jan. 5, 2022 (CN) .......................... 202210007628.9

(51) Int. Cl.
| | | |
|---|---|---|
| C09D 7/61 | (2018.01) | |
| C09D 7/20 | (2018.01) | |
| C09D 7/80 | (2018.01) | |
| C09D 163/10 | (2006.01) | |
| C08K 7/00 | (2006.01) | |
| C09D 5/08 | (2006.01) | |
| C08G 59/17 | (2006.01) | |
| C08G 59/14 | (2006.01) | |
| C09D 7/40 | (2018.01) | |

(52) U.S. Cl.
CPC .......... *C09D 5/084* (2013.01); *C08G 59/1466* (2013.01); *C08G 59/1494* (2013.01); *C08K 7/00* (2013.01); *C09D 7/20* (2018.01); *C09D 7/61* (2018.01); *C09D 7/70* (2018.01); *C09D 7/80* (2018.01); *C09D 163/10* (2013.01)

(58) Field of Classification Search
CPC . C09D 5/084; C09D 7/61; C09D 7/20; C09D 7/70; C09D 7/80; C09D 163/10; C08G 59/1466; C08G 59/1494; C08K 7/00
USPC .......................................................... 524/612
See application file for complete search history.

(56) References Cited

U.S. PATENT DOCUMENTS

2021/0094831 A1* 4/2021 Barsoum ............... C01B 32/921

FOREIGN PATENT DOCUMENTS

CN          105694658 A  *  6/2016

OTHER PUBLICATIONS

Fang, Heng and South China University of Technology (Applicants), Preliminary Amendment for CN202210007628.9, w/ (allowed) replacement claims, dated Apr. 27, 2022.
CNIPA, Notification to grant patent right for invention in CN202210007628.9, dated May 7, 2022.

* cited by examiner

*Primary Examiner* — Kelechi C Egwim
(74) *Attorney, Agent, or Firm* — Zhigang Ma

(57) ABSTRACT

A method for improving corrosion resistance of vinyl ester resin is provided, which belongs to the technical field of polymer materials. The method includes adding vinyl ester resin into a MXene nanosheet solution and evaporating the solvent; then adding cobalt isooctoate promoter and butanone peroxide initiator in sequence, standing for curing after defoaming, and then heating.

6 Claims, 1 Drawing Sheet

METHOD FOR IMPROVING CORROSION RESISTANCE OF VINYL ESTER RESIN

CROSS-REFERENCE TO RELATED APPLICATION

This application claims priority to Chinese Patent Application No. 2022100076289, filed on Jan. 5, 2022, the contents of which are hereby incorporated by reference.

TECHNICAL FIELD

The disclosure belongs to the technical field of polymer materials, and particularly relates to a method for improving the corrosion resistance of vinyl ester resin.

BACKGROUND

Vinyl ester resin is a thermosetting resin synthesized by reacting methacrylic acid with bisphenol A epoxy resin, which can be cured quickly at room temperature and has good mechanical properties of epoxy resin. As a good corrosion protection material with stable chemical properties, good adhesion and corrosion resistance, vinyl ester resin has been widely used in the surface corrosion resistance of metals and other materials. However, once corrosive substances such as water, oxygen, acid, alkali and salt ions diffuse to the metal/resin interface and begin to gradually erode the metal surface, the coating will gradually lose its adhesion and eventually lose its protective effect. A protective coating of high corrosion resistance is needed in strong acid and alkali environment with a relatively extreme pH.

To improve the corrosion resistance of vinyl ester resins in extreme pH environments and to extend the service life of protective coatings, it is necessary to modify vinyl ester resin to improve its corrosion resistance.

SUMMARY

Aiming at the above-mentioned shortcomings in the prior art, the disclosure provides a method for improving the corrosion resistance of vinyl ester resin.

To achieve the above purpose, the disclosure provides the following technical scheme:

Adding vinyl ester resin into MXene nanosheet solution and evaporating the solvent; then adding cobalt isooctoate promoter and butanone peroxide initiator in turn, standing for curing after defoaming, and then heating.

Further, the MXene nanosheet solution is an ethanol solution of MXene nanosheets, and the mass of MXene nanosheets is 0.001-100% of the mass of the vinyl ester resin.

Further, the method for evaporating the solvent specifically comprises evaporating ethanol at a temperature of 50-200° C. in a water bath.

Further, after adding the vinyl ester resin into the MXene nanosheet solution, the steps of stirring and ultrasonic dispersion are followed.

Further, the addition amounts of cobalt isooctoate and butanone peroxide are both 0.5-1.5% of the mass of vinyl ester resin.

Further, after adding the cobalt isooctoate accelerator and the butanone peroxide initiator, stirring is performed for 1-60 min respectively.

Further, the defoaming is carried out in a vacuum environment at a temperature of 50-200° C. for 1-60 min, and the standing time is 24-72 h.

The disclosure also provides a modified vinyl ester resin prepared according to the method.

Compared with the prior art, the disclosure has the following beneficial effects:

The corrosion resistance of vinyl ester resin modified by MXene nanosheets is based on the mechanism that the combination of nanosheets and resin improves the barrier performance of resin coating to corrosive liquids and gases, effectively improves the hydrophobicity of resin coating, and at the same time, the insulation effect of resin coating to corrosive ions may be effectively improved after modification.

According to the disclosure, the corrosion resistance of vinyl ester resin is modified for the first time by using two-dimensional MXene nanosheets, the preparation process is simple, the addition amount of nanosheets is small, and the corrosion resistance of vinyl ester resin could be well improved.

BRIEF DESCRIPTION OF THE DRAWINGS

In order to more clearly explain embodiments of the disclosure or the technical solution in the prior art, the drawings used in the illustrative embodiments will be briefly introduced below. Apparently, the drawings in the following description are only some embodiments of the disclosure, and for ordinary technicians in the field, other drawings could be obtained according to these drawings without creative efforts.

DETAILED DESCRIPTION OF THE EMBODIMENTS

Figure 1A:
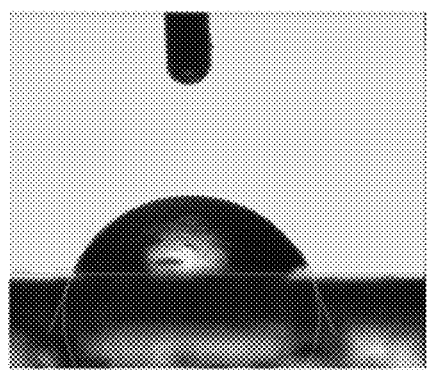
FIG. 1A and FIG. 1B are schematic diagrams of water contact angles of vinyl ester resin and modified vinyl ester resin prepared in Embodiment 1.

Now various exemplary embodiments of the disclosure will be described in detail. This detailed description should not be considered as a limitation of the disclosure, but should be understood as a more detailed description of some aspects, characteristics and embodiments of the disclosure. It should be understood that the terms used in this disclosure are only for describing specific embodiments, and are not used to limit the disclosure.

In addition, for the numerical range in the disclosure, it should be understood that each intermediate value between the upper limit and the lower limit of the range is also specifically disclosed. Any stated value or intermediate value within the stated range and any other stated value or every smaller range between intermediate values within the stated range are also included in the disclosure. The upper and lower limits of these smaller ranges could be independently included or excluded from the range.

Unless otherwise specified, all technical and scientific terms used herein have the same meaning as commonly understood by the ordinary technicians in the field of this disclosure. Although the disclosure only describes the illustrative methods and materials, any methods and materials similar or equivalent to those described herein can also be used in the practice or testing of the disclosure. All documents mentioned in this specification are incorporated by reference to disclose and describe the methods and/or materials related to the documents. In case of conflicts with any incorporated documents, the contents of this specification shall prevail.

Without departing from the scope or spirit of the disclosure, it is apparent to those skilled in the art that many modifications and changes can be made to the specific embodiments of the disclosure. Other embodiments obtained from the description of the disclosure will be apparent to the skilled person. The description and examples of the disclosure are exemplary only.

The words "including", "comprising", "having" and "containing" used in this paper are all open terms, that is, they mean including but not limited to.

The vinyl ester resin used in the following illustrative embodiments is a standard bisphenol A epoxy vinyl ester resin synthesized by the reaction of methacrylic acid and bisphenol A epoxy resin. In the following illustrative embodiments, MXene is generally a new type of two-dimensional transition metal carbide, nitride or carbonitride, it is with graphene-like 2D morphology. A chemical formula of MXene generally is $M_{n+1}X_nT_z$, where M is an early transition metal which is generally one selected from group IIIB through group VIIB in the periodic table of elements, such as Ti, Zr, V, Mo; X is C and/or N; Tz stands for a surface-terminating functional group like $F^-$, $Cl^-$, $OH^-$, $O^{2-}$, etc., and n=1, 2, or 3. MXene has a two-dimensional layered structure, large specific surface area and good electrical conductivity, stability, magnetic and mechanical properties.

Embodiment 1

A method for enhancing the corrosion resistance of vinyl ester resin by using two-dimensional MXene nanosheets includes the following steps:

(1) adding 5 grams (g) vinyl ester resin into 25 milliliters (mL), 0.25 mg/mL ethanol solution of MXene nanosheets, mechanically stirring and mixing for 10 minutes (min), and ultrasonically dispersing for 30 min.

(2) heating the dispersed composite/combination obtained in step (1) in a water bath at 78° C., and evaporating ethanol; then adding 0.05 g cobalt isooctoate accelerator and mechanically stirring for 10 min; then, adding 0.05 g of butanone peroxide initiator and mechanically stirring for 10 min.

(3) vacuum defoaming the nanosheet/resin composite obtained in step (2) at 80° C. for 10 min, evenly coating the defoamed nanosheet/resin composite on Q235 steel plate with 50*50*1 mm specification, standing for 24 hours, and heating at 80° C. for 2 h to obtain a sample to be tested.

Embodiment 2

A method for improving the corrosion resistance of vinyl ester resin by using two-dimensional MXene nanosheets includes the following steps:

(1) adding 5 g vinyl ester resin into 200 mL, 0.25 mg/mL ethanol solution of MXene nanosheets, mechanically stirring and mixing for 30 min, and ultrasonically dispersing for 60 min.

(2) heating the dispersed composite obtained in step (1) in a water bath at 78° C., and evaporating ethanol; then, adding 0.025 g cobalt isooctoate accelerator and mechanically stirring for 15 min; then, adding 0.025 g of butanone peroxide initiator and mechanically stirring for 15 min.

(3) vacuum defoaming the resin composite obtained in step (2) at 200° C. for 30 min, uniformly coating the defoamed composite on the Q235 steel plate with the specification of 100*100*1 mm, standing for 24 h, and heating at 100° C. for 4 h to obtain another sample to be tested.

Embodiment 3

A method for improving the corrosion resistance of vinyl ester resin by using two-dimensional MXene nanosheets includes the following steps:

(1) adding 500 g vinyl ester resin into 2000 mL, 0.5 mg/mL ethanol solution of MXene nanosheets, mechanically stirring and mixing for 60 min, and ultrasonically dispersing for 60 min.

(2) heating the dispersed composite obtained in step (1) in a water bath at 85° C., and evaporating ethanol; then, adding 7.5 g cobalt isooctoate accelerator and mechanically stirring for 15 min; then, adding 7.5 g of butanone peroxide initiator and mechanically stirring for 15 min.

(3) vacuum defoaming the resin composite obtained in step (2) at 80° C. for 20 min, uniformly coating the defoamed composite on the Q235 steel plate with the specification of 100*100*1 mm, standing for 24 h, and heating at 100° C. for 4 h to obtain still another sample to be tested.

Comparative embodiment 1

(1) adding 5 g vinyl ester resin into 25 mL ethanol solution, mechanically stirring for 10 min, ultrasonically dispersing for 30 min, heating in water bath at 78° C. to evaporate ethanol, then adding 0.05 g cobalt isooctoate accelerator, mechanically stirring for 10 min, then adding 0.05 g butanone peroxide initiator and mechanically stirring for 10 min.

(2) vacuum defoaming the mixture obtained in step (1) at 80° C. for 10 min; then evenly coating the defoamed resin on Q235 steel plate with the specification of 50*50*1 mm, standing for 24 h, and heating at 80° C. for 2 h to obtain the sample to be tested.

Effect Verification:

Testing the corrosion resistance of the untreated vinyl ester resin, the modified vinyl ester resins prepared in Embodiments 1-3 and the sample to be tested prepared in Comparative embodiment 1: after soaking each sample in 3.5 wt % NaCl solution for two days, testing the open-circuit potential with a three-electrode electrochemical workstation, and the results are shown in TABLE 1.

TABLE 1

| Group | Open-circuit potential |
| --- | --- |
| vinyl ester resin (untreated) | 21.4 mV |
| Embodiment 1 | 41.3 mV |
| Embodiment 2 | 40.6 mV |
| Embodiment 3 | 45.1 mV |
| Comparative embodiment 1 | 22.6 mV |

The larger the open-circuit potential, the smaller the corrosion degree of the sample. From TABLE 1, it can be seen that the disclosure can significantly improve the corrosion resistance of vinyl ester resin by using MXene nanosheets to modify the vinyl ester resin.

Figure 1B:
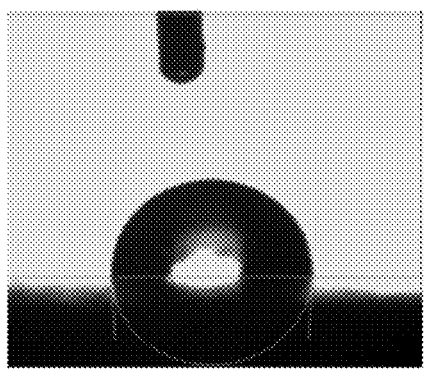

Measuring the water contact angle of each group of samples after soaking by using the surface contact angle tester to test the hydrophilic/hydrophobic properties of the samples, and the water contact angles of each group of samples are shown in TABLE 2. The water contact angle test results of untreated vinyl ester resin and modified resin prepared in Embodiment 1 are shown in FIG. 1A and FIG. 1B.

TABLE 2

| Group | Water contact angle/° |
|---|---|
| vinyl ester resin (untreated) | 69.7 |
| Embodiment 1 | 93.6 |
| Embodiment 2 | 91.2 |
| Embodiment 3 | 88.7 |
| Comparative embodiment 1 | 64.5 |

It can be seen from TABLE 2, after soaking the unmodified vinyl ester resin sample in 3.5 wt % NaCl solution for two days, measuring the water contact angle was to be 69.7. Measuring the water contact angle of the modified vinyl ester resin sample after being soaked in 3.5 wt % NaCl solution for two days, and the water contact angle is above 90°. It can be seen that the liquid isolation performance of the modified resin is significantly improved.

It can be seen from TABLE 1 and TABLE 2 that the modified resin sample obtained by modifying vinyl ester resin with two-dimensional MXene nanosheets of the disclosure shows better corrosion resistance in 3.5 wt % NaCl solution, and at the same time, the hydrophobic property of the modified resin sample may be better.

What has been described above is only illustrative embodiments of the disclosure, and the scope of protection of the disclosure is not limited thereto. Any person skilled the technical field who makes equivalent replacement or change within the technical scope disclosed by the disclosure according to the illustrated technical scheme and inventive concept of the disclosure should be covered within the scope of protection defined in the appended set of claims.

What is claimed is:

1. A method for improving corrosion resistance of vinyl ester resin, comprising:
   adding a vinyl ester resin into a MXene nanosheet solution to obtain a resultant solution and evaporating solvent of the resultant solution to obtain a target material;
   adding a cobalt isooctoate promoter and a butanone peroxide initiator to the target material in sequence, defoaming and standing for curing, and heating to obtain a modified vinyl ester resin;
   wherein the MXene nanosheet solution is an ethanol solution with MXene nanosheets, and a mass of the MXene nanosheets is in a range of 0.001-100% of a mass of the vinyl ester resin;
   wherein an addition amount of each of the cobalt isooctoate promoter and the butanone peroxide initiator is in a range of 0.5-1.5% of a mass of the vinyl ester resin.

2. The method according to claim 1, further comprising: performing stirring and ultrasonic dispersion, after adding the vinyl ester resin into the MXene nanosheet solution.

3. The method according to claim 1, further comprising: stirring for a duration in a range of 1-60 minutes (min) after adding each of the cobalt isooctoate promoter and the butanone peroxide initiator.

4. The method according to claim 1, wherein the defoaming is carried out in a vacuum environment at a temperature in a range of 50-200° C. for a duration in a range of 1-60 min, and a duration for the standing is in a range of 24-72 hours (h).

5. The method according to claim 1, wherein a temperature of the heating is in a range of 50-200° C., and a duration for the heating is in a range of 24-72 h.

6. A modified vinyl ester resin prepared by the method according to claim 1.

* * * * *